United States Patent
Lee et al.

(10) Patent No.: US 7,437,557 B2
(45) Date of Patent: Oct. 14, 2008

(54) GARBAGE COLLECTION SYSTEM AND METHOD FOR A MOBILE COMMUNICATION TERMINAL

(75) Inventors: Hyeon Lee, Seoul (KR); Hak-Gyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 10/856,618

(22) Filed: May 28, 2004

(65) Prior Publication Data

US 2004/0248612 A1    Dec. 9, 2004

(30) Foreign Application Priority Data

Jun. 3, 2003 (KR) .................. 10-2003-0035735
Aug. 8, 2003 (KR) .................. 10-2003-0055048

(51) Int. Cl.
*H04L 9/00* (2006.01)

(52) U.S. Cl. .................. 713/164; 707/206; 713/171

(58) Field of Classification Search .......... 713/171, 713/164; 707/206
See application file for complete search history.

(56) References Cited

U.S. PATENT DOCUMENTS

| | | | | |
|---|---|---|---|---|
| 6,098,080 A | * | 8/2000 | Endicott et al. | 707/206 |
| 6,141,722 A | * | 10/2000 | Parsons | 711/2 |
| 6,282,621 B1 | * | 8/2001 | Parsons | 711/170 |
| 6,321,240 B1 | * | 11/2001 | Chilimbi et al. | 707/206 |
| 6,807,551 B2 | * | 10/2004 | Sayag | 707/206 |
| 6,898,602 B2 | * | 5/2005 | Sayag | 707/206 |
| 6,961,740 B2 | * | 11/2005 | O'Connor et al. | 707/206 |
| 2003/0126164 A1 | * | 7/2003 | O'Connor et al. | 707/206 |
| 2003/0200409 A1 | * | 10/2003 | Sayag | 711/170 |
| 2003/0200530 A1 | * | 10/2003 | Sayag | 717/114 |
| 2004/0010681 A1 | * | 1/2004 | Lee | 713/2 |
| 2004/0117651 A1 | * | 6/2004 | Little et al. | 713/200 |
| 2005/0129235 A1 | * | 6/2005 | Little et al. | 380/255 |
| 2007/0180540 A1 | * | 8/2007 | Little et al. | 726/34 |

FOREIGN PATENT DOCUMENTS

| | | |
|---|---|---|
| CN | 1178345 | 4/1998 |
| KR | 10-2003-0015687 | 2/2003 |

* cited by examiner

*Primary Examiner*—Nasser Moazzami
*Assistant Examiner*—David Garcia Cervetti
(74) *Attorney, Agent, or Firm*—Lee, Hong, Degerman, Kang & Schmadeka

(57) ABSTRACT

A garbage collection method is provided. The method comprises setting at least a garbage collection condition for the mobile terminal; converting a state of the mobile terminal from a first state to a second state when the at least one garbage collection condition is met; and starting a garbage collection procedure while the mobile terminal is in the first state, wherein in the first state the garbage collection procedure is not interrupted by an external event.

26 Claims, 2 Drawing Sheets

GARBAGE COLLECTION SYSTEM AND METHOD FOR A MOBILE COMMUNICATION TERMINAL

CROSS-REFERENCE TO RELATED APPLICATIONS

This application claims priority from Korean Patent Application Nos. 35735/2003, filed Jun. 3, 2003 and 55048/2003, filed Aug. 8, 2003, the entire contents of which are incorporated herein by reference.

BACKGROUND OF THE INVENTION

1. Field of the Invention

The present invention relates to a mobile terminal, and in particular to a garbage collection system and method for deleting not needed files stored in the active memory of a mobile communication terminal.

2. Description of Related Art

With the development of mobile communication techniques and terminal fabrication techniques, an individual can use a mobile terminal to watch moving pictures, listen to music, connect to the Internet and play mobile games. In order to make a mobile terminal perform the above various functions, a high capacity flash memory is essential. To play moving pictures and music, the terminal needs to have the capacity to store large volumes of data. To maintain a sufficiently free data storage space, not needed or garbage data such as unused programs, read word-messages, and music or image files to which a user will not listen/watch need to be deleted, before new data can be stored. This can be performed by a write/delete function applied to the flash memory areas that contain the unnecessary or unwanted data (hereafter "garbage").

In a general flash memory, data is stored by recording a byte unit or a word unit. However, data can be deleted only by deleting a designated sector in each storage device. Accordingly, in an EFS (embedded file system), in order to use characteristics of the flash memory, a region is divided/managed into blocks having a certain size, and each block has a header so as to indicate the nature of the recorded contents.

When contents of the block are changed, the block is processed as garbage, a free block is reallocated, and changed contents are recorded again. When garbage generated in deleting or changing of data is increased, the size of a usable free block is reduced. When garbage exceeds a predetermined amount, the terminal deletes the garbage automatically. This is called "garbage collection."

In a general garbage collection method, there are two approaches, one is performing garbage collection automatically when garbage exceeding a designated reference percentage of one sector is generated, and the other is performing garbage collection forcibly according to a request from a file system when there is data to be stored and there is an insufficient number of free blocks.

Unfortunately, in performing garbage collection for lack of a storage space or when garbage exceeds a reference level, the terminal may reset or the terminal operation speed may be diminished, if system resources are utilized beyond their limits.

In addition, if garbage is unnecessarily collected too frequently, the memory processing speed may be diminished, and the life span of the memory may be adversely affected.

SUMMARY OF THE INVENTION

A garbage collection method for a mobile terminal comprises setting at least a garbage collection condition for the mobile terminal; converting a state of the mobile terminal from a first state to a second state when the at least one garbage collection condition is met; and starting a garbage collection procedure while the mobile terminal is in the first state, wherein in the first state the garbage collection procedure is not interrupted by an external event.

The method may further comprise notifying a user when garbage collection procedure starts, and notifying a user when garbage collection procedure is completed. The state of the mobile terminal is reverted from the second state back to the first state when the garbage collection procedure is completed. The first state represents an idle state for the mobile terminal. The second state represents a safe mode for the mobile terminal. In an idle state the mobile terminal can but is not performing any telephony events. In the safe mode the mobile terminal cannot perform any telephony events.

At least one garbage collection condition is met when the mobile terminal is in an idle state. At least one garbage collection condition is met when the mobile terminal comprises a clam-shell design having a flip portion, and wherein the flip portion is closed, for example. At least one garbage collection condition is met when level of garbage collected exceeds a first threshold. At least one garbage collection condition is met by way of a user interacting with the mobile terminal. The user may interact with the mobile terminal by way of at least one of a touch display, a microphone, and a keypad.

In one embodiment, a user is notified of progress of the garbage collection procedure by way of at least one of a visual alert, a voice alert, and a tactile alert. A telephony event comprises at least one of communicating a message, receiving a voice call, and making a voice call. In one embodiment, the garbage collection procedure is stopped when a telephony event occurs.

A method of managing storage space in a mobile communication device, wherein the storage space is utilized to store telephony event related data is provided. The method comprises monitoring the mobile communication device to detect an idle state, wherein no telephony events are pending; switching the mobile communication device to a safe mode, wherein no telephony event may be performed by the mobile communication terminal; and removing unwanted data from the storage space while the mobile communication device is in the safe mode.

The removing step is terminated when at least a telephony event is received by the mobile communication device. The switching step is performed when a first condition is met. The first condition is met according to a command input to the mobile communication terminal to manage the storage space. Alternatively, the first condition is met when the free space in the storage space has reached a minimum threshold.

A mobile communication terminal, in accordance with another embodiment, comprises a user interface module for controlling user interface features of the mobile communication terminal; a file system module for controlling garbage management of data stored in mobile communication terminal's storage space; and a mode control module for switching the mobile communication terminal from a first mode to a second mode, when at least one condition is met.

The first mode is an idle mode. The second mode is a safe mode. The file system module removes garbage from the mobile communication's storage space, when the mode control module switches the mobile communication terminal from the first mode to the second mode.

BRIEF DESCRIPTION OF THE DRAWINGS

The accompanying drawings are included to provide a further understanding of the invention. They are incorporated in and constitute a part of this specification, illustrate embodiments of the invention and together with the description serve to explain the principles of the invention.

DETAILED DESCRIPTION OF PREFERRED EMBODIMENTS

Figure 1:
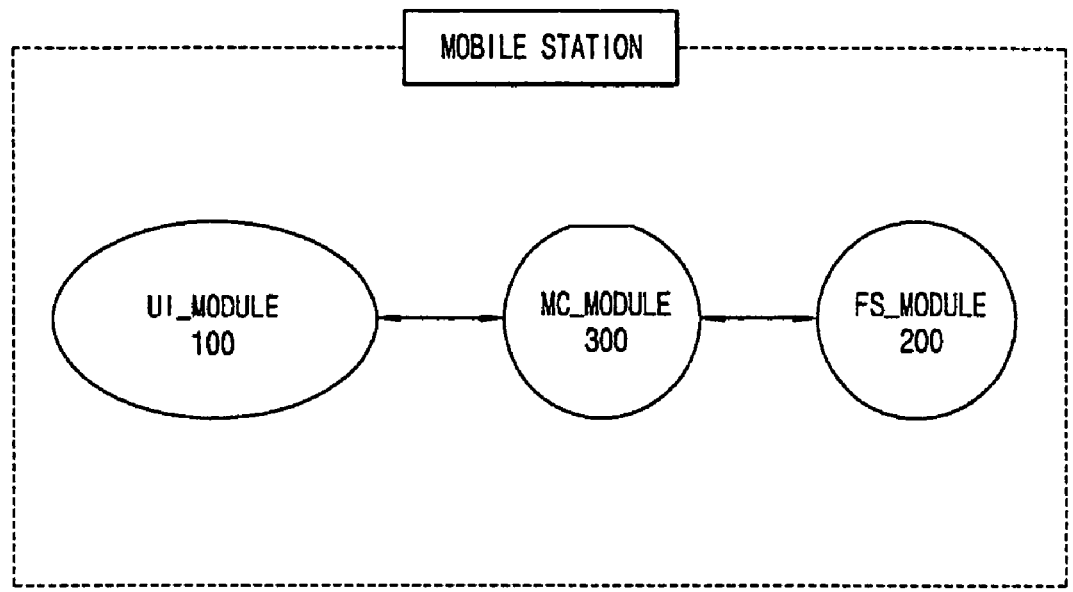
FIG. 1 is a block diagram illustrating a garbage collection method for a mobile terminal in accordance with one embodiment of the invention.

Referring to FIG. 1, a UI (user interface) module 100 is provided for setting garbage collection conditions and notifying the user of when garbage collection starts and ends. An FS (file system) module 200 is provided for generating garbage, checking whether the garbage collection conditions are satisfied, and performing garbage collection. An MC (micro-control) module 300 is provided for converting the mobile terminal into a safe mode and performing of garbage collection.

The UI, FS and MC modules may be implemented in the form of hardware, software or a combination thereof. The UI_module 100 controls operations of a display unit 10, a speaker unit 20, a voice input unit 30 and a key input unit 40, for example. Garbage collection conditions of the UI_module 100 may be set by the user through key inputs.

For example, a user may select to perform the garbage collection procedure when a flip part of the mobile terminal is closed (i.e., when the mobile terminal is in an idle state) or when garbage size is greater than a threshold. The FS_module 200 notifies the UI_module 100 of the time when garbage collection starts or ends. The UI_module 100 notifies the user of garbage collection times, and accordingly the user is alerted that garbage collection is in progress.

To notify the user of start and end of the garbage collection, various methods such as displaying a character or an icon on the display unit of the mobile terminal or generating a sound through the speaker unit, or vibrating the mobile terminal may be implemented. The user can set up and change the above methods, depending on implementation.

In one embodiment, the FS_module 200 controls operation of the memory unit 50. When conditions set up by the user are satisfied, the UI_module 100 requests the MC_module 300 to convert the terminal from an idle_state into a safe mode. When the MC_module 300 converts the terminal into the safe mode, the garbage collection is performed.

When the user sets up conditions to perform the garbage collection and when the terminal folder is closed, for example, the FS_module 200 determines if the conditions are satisfied by sensing opening/closing of the folder or determining when the mobile terminal is idle. The user may set up conditions to perform garbage collection when garbage is greater than a certain percent of a memory capacity. In that case, the FS_module 200 determines if conditions are satisfied by checking the memory use rate.

In addition, when the conditions are satisfied and the garbage collection is performed, the FS_module 200 notifies the UI_module 100 and the MC-module 300 of the garbage collection process starting or ending. The MC_module 300 controls operations of the control unit 60. When the garbage collection process starts, FS_module 200 switches the state of the terminal from idle state to safe mode and notifies the FS_module 200 of the mode conversion, and accordingly garbage collection is performed.

Idle state refers to a condition in which the mobile terminal is not performing any telephony events, even though it can. That is, idle state represents an instance when mobile terminal is not communicating with another system or is not in the process of making or receiving a call. In the safe mode, however, the mobile device cannot perform any telephony events. The safe mode means that a message cannot be received and conversation by telephone cannot be performed. Safe mode is set in order to prevent external interruptions during the garbage collection process.

In one embodiment, because the user may have an important telephone call or message while the garbage collection is performed, in conversion of the mobile terminal into the safe mode, it may be possible to receive a message and/or communicate selectively according to user's set up. In that case, when a message is received or a telephone call is received, while the garbage collection process is being performed, it is possible to check the message or answer the telephone by stopping the garbage collection process and converting the state of the mobile terminal from the safe mode back to the idle state.

In addition, when the FS_module 200 determines that the garbage collection is finished, the MC_module 300 converts the sate of the mobile terminal from the safe mode into the idle state, in accordance with one embodiment.

Figure 2:
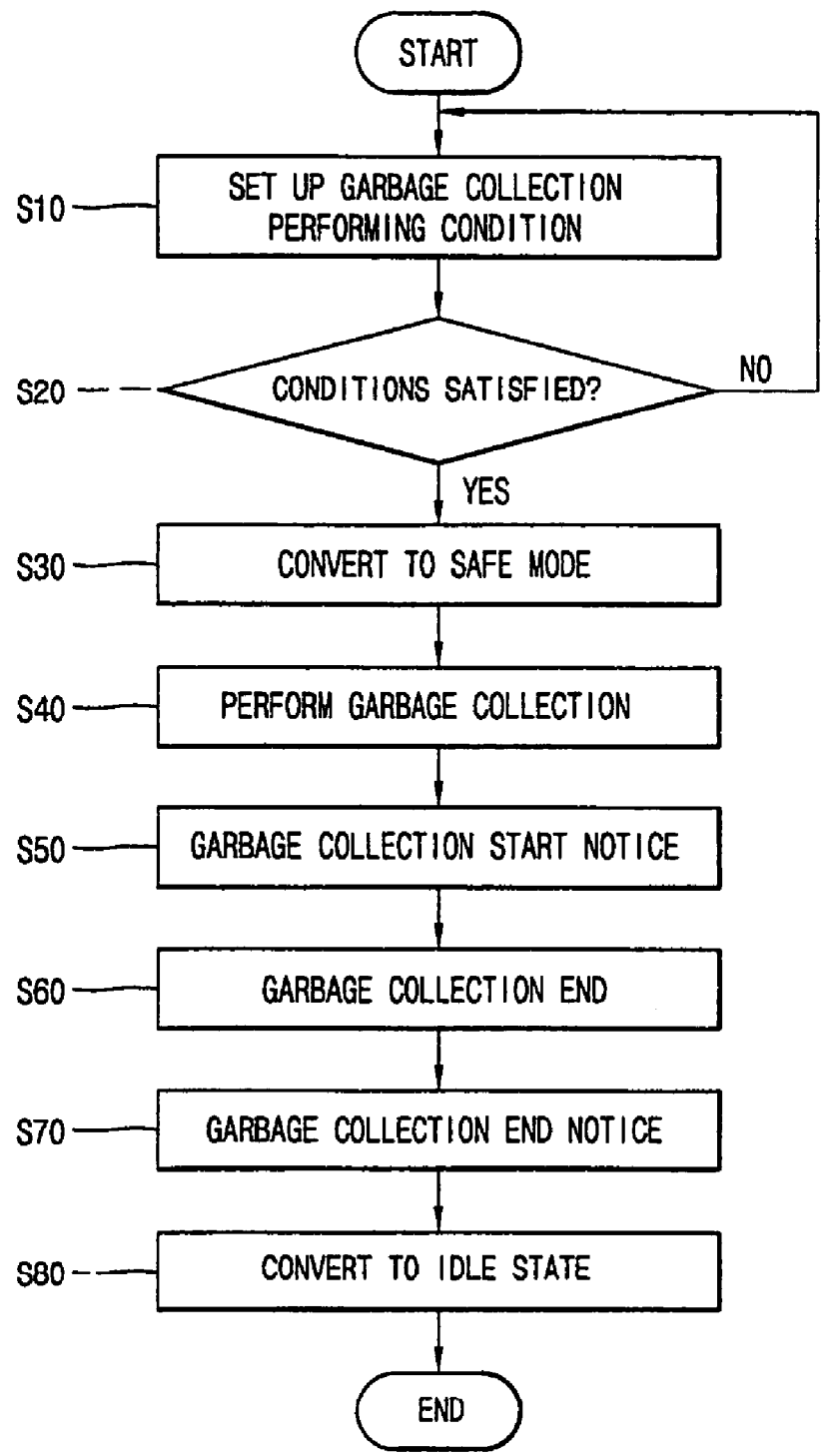
FIG. 2 is a flow chart illustrating a garbage collection method for a mobile terminal in accordance with one embodiment of the present invention.

Referring to FIG. 2, a user may set up garbage collection performing conditions through the key input unit of the mobile terminal (S10). Afterward, the mobile terminal determines whether the user setting conditions are satisfied (S20). When the conditions are satisfied, the mobile terminal is converted from the idle state into the safe mode in order to prevent interruptions from the outside and to perform a stable garbage collection procedure (S30).

In one embodiment, the garbage collection conditions comprise judging whether the garbage collection is performed when the mobile terminal is idle or when garbage is greater than a threshold, or immediately. If the user sets up a condition to perform the garbage collection when the terminal is idle, the mobile terminal determines satisfaction of the condition by sensing if the terminal is inactive, for example.

If the user sets a condition to perform the garbage collection process when garbage is greater than a threshold, satisfaction of the condition is determined by checking the memory capacity and garbage stored. In addition, if the user sets a condition to perform the garbage collection immediately, the mobile terminal generates a control signal to force the garbage collection immediately.

When the mobile terminal is switched to safe mode, garbage collection is performed (S40). The mobile terminal notifies the user of the beginning of the garbage collection process through display of a character or an icon on the display unit, sound generated from the speaker unit, vibration, etc. (S50). Similarly, after the garbage collection process is completed (S60), the mobile terminal notifies the user that the garbage collection process has ended by displaying a character or an icon on the display unit, or a sound generated from the speaker unit, vibration of the terminal, etc. (S70). Thereafter, the safe mode is switched to the idle state (S80).

As described-above, in the garbage collection method for a mobile terminal in accordance with one embodiment of the invention, by performing garbage collection in the safe mode, it is possible to avoid unwanted interruptions in order to make the memory perform the garbage collection under stable conditions.

In addition, in the garbage collection method for the mobile terminal in accordance with one embodiment of the present invention, a user can set up garbage collection conditions in a file system implemented on a large capacity memory when the mobile terminal user is notified of garbage collection proceedings and the user can perform garbage collection as occasion demands.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A garbage collection method for a mobile terminal comprising:
    setting at least a garbage collection condition for the mobile terminal;
    converting a state of the mobile terminal from a first state to a second state when the at least one garbage collection condition is met; and
    starting a garbage collection procedure while the mobile terminal is in the second state, wherein in the second state the garbage collection procedure cannot be interrupted by an external telephony event or user interaction, unless a predefined condition is met to override the second state and to return the mobile terminal back to the first state, such that in the first state the mobile terminal is responsive to external telephony events and user interaction.

2. The method of claim 1, further comprising:
    notifying a user when garbage collection procedure starts.

3. The method of claim 1, further comprising:
    notifying a user when garbage collection procedure is completed.

4. The method of claim 1, further comprising:
    reverting the state of the mobile terminal from the second state back to the first state when the garbage collection procedure is completed.

5. The method of claim 1, wherein the first state represents an idle state for the mobile terminal.

6. The method of claim 5, wherein in an idle state the mobile terminal can but is not performing any telephony events.

7. The method of claim 1, wherein the second state represents a safe mode for the mobile terminal.

8. The method of claim 7, wherein in the safe mode the mobile terminal cannot perform any telephony events.

9. The method of claim 8, wherein a telephony event comprises at least one of communicating a message, receiving a voice call, and making a voice call.

10. The method of claim 1, wherein said at least one garbage collection condition is satisfied when the mobile terminal is in an idle state.

11. The method of claim 1, wherein said at least one garbage collection condition is satisfied when the mobile terminal comprises a clam-shell design having a flip portion, and wherein the flip portion is closed.

12. The method of claim 1, wherein said at least one garbage collection condition is satisfied, when level of garbage collected exceeds a first threshold.

13. The method of claim 1, wherein said at least one garbage collection condition is satisfied by way of a user interacting with the mobile terminal.

14. The method of claim 13, wherein the user may interact with the mobile terminal by way of at least one of a touch display, a microphone, and a keypad.

15. The method of claim 1, wherein a user is notified of progress of the garbage collection procedure by way of at least one of a visual alert, a voice alert, and a tactile alert.

16. The method of claim 1, further comprising:
    stopping the garbage collection procedure when a telephony event occurs.

17. The method of claim 16, further comprising:
    converting the state of the mobile terminal from the second state to the first state.

18. A method of managing storage space in a mobile communication device, wherein the storage space is utilized to store telephony event related data, the method comprising:
    monitoring the mobile communication device to detect an idle state, wherein no telephony events are pending;
    switching the mobile communication device to a safe mode, wherein no telephony event may be performed by the mobile communication device; and
    removing unwanted data from the storage space while the mobile communication device is in the safe mode;
    wherein in the safe mode the garbage collection procedure cannot be interrupted by an external telephony event or user interaction, unless a redefined condition is met to override the safe mode and to return the mobile terminal back to a first mode, such that in the first mode the mobile terminal is responsive to external telephony events or user interaction.

19. The method of claim 18, wherein the removing step is terminated when at least a telephony event is received by the mobile communication device.

20. The method of claim 18, wherein the switching step is performed when a first condition is satisfied.

21. The method of claim 20, wherein the first condition is satisfied according to a command input to the mobile communication device to manage the storage space.

22. The method of claim 20, wherein the first condition is satisfied when the free space in the storage space has reached a minimum threshold.

23. A mobile communication device comprising:
    a user interface module for controlling user interface features of the mobile communication device;
    a file system module for controlling garbage management of data stored in the mobile communication device's storage space; and
    a mode control module for switching the mobile communication device from a first mode to a second mode,
    wherein in the second mode the garbage management procedure cannot be interrupted by an external telephony event or user interaction, unless a predefined condition is met to override the second mode and to return the mobile terminal back to the first mode, such that in the first mode the mobile terminal is responsive to external telephony events or user interaction.

24. The mobile communication device of claim 23, wherein the first mode comprises an idle mode.

25. The mobile communication device of claim 23, wherein the second mode comprises a safe mode.

26. The mobile communication device of claim 23, wherein the file system module removes garbage from the mobile communication device's storage space, when the mode control module switches the mobile communication terminal from the first mode to the second mode.

* * * * *